United States Patent
Yazdani (10) Patent No.: US 9,639,371 B2
(45) Date of Patent: May 2, 2017

(54) SOLUTION TO DIVERGENT BRANCHES IN A SIMD CORE USING HARDWARE POINTERS

(71) Applicant: Advanced Micro Devices, Inc., Sunnyvale, CA (US)

(72) Inventor: Reza Yazdani, Los Altos, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 734 days.

(21) Appl. No.: 13/753,113

(22) Filed: Jan. 29, 2013

(65) Prior Publication Data

US 2014/0215187 A1 Jul. 31, 2014

(51) Int. Cl.
*G06F 9/38* (2006.01)
*G06F 9/30* (2006.01)
(Continued)

(52) U.S. Cl.
CPC ............ *G06F 9/3887* (2013.01); *G06F 8/445* (2013.01); *G06F 9/30058* (2013.01);
(Continued)

(58) Field of Classification Search
CPC .................................................. G06F 9/3853
(Continued)

(56) References Cited

U.S. PATENT DOCUMENTS 5,673,410 A * 9/1997 Kurisu ................ G06F 9/30014
712/210
5,898,865 A 4/1999 Mahalingaiah
(Continued)

FOREIGN PATENT DOCUMENTS

CN 1174353 A 2/1998
CN 102043755 A 5/2011
(Continued)

OTHER PUBLICATIONS

Steffen, Michael et al., "Improving SIMT Efficiency of Global Rendering Algorithms with Architectural Support for Dynamic Micro-Kernels", In Proceedings of the 2010 43rd Annual IEEE/ACM International Symposium on Microarchitecture, Micro '43, 237-248, 12 pages.
(Continued)

*Primary Examiner* — Andrew Caldwell
*Assistant Examiner* — Michael Metzger
(74) *Attorney, Agent, or Firm* — Rory D. Rankin; Meyertons, Hood, Kivlin, Kowert & Goetzel, P.C.

(57) ABSTRACT

A system and method for efficiently processing instructions in hardware parallel execution lanes within a processor. In response to a given divergent point within an identified loop, a compiler generates code wherein when executed determines a size of a next very large instruction world (VLIW) to process and determine multiple pointer values to store in multiple corresponding PC registers in a target processor. The updated PC registers point to instructions intermingled from different basic blocks between the given divergence point and a corresponding convergence point. The target processor includes a single instruction multiple data (SIMD) micro-architecture. The assignment for a given lane is based on branch direction found at runtime for the given lane at the given divergent point. The processor includes a vector register for mapping PC registers to execution lanes.

17 Claims, 9 Drawing Sheets

(51) Int. Cl.
*G06F 9/32* (2006.01)
*G06F 9/45* (2006.01)

(52) U.S. Cl.
CPC ............ *G06F 9/321* (2013.01); *G06F 9/3804* (2013.01); *G06F 9/3851* (2013.01); *G06F 9/3853* (2013.01); *G06F 9/3889* (2013.01)

(58) Field of Classification Search
USPC ........................................................ 712/215
See application file for complete search history.

(56) References Cited

U.S. PATENT DOCUMENTS

| | | | |
|---|---|---|---|
| 5,898,866 A | 4/1999 | Atkins et al. | |
| 5,968,167 A * | 10/1999 | Whittaker | G06F 9/3851 712/225 |
| 6,003,128 A | 12/1999 | Tran | |
| 6,014,741 A | 1/2000 | Mahalingaiah | |
| 6,032,252 A | 2/2000 | Petro et al. | |
| 7,287,152 B2 * | 10/2007 | Wilson | G06F 9/30014 712/22 |
| 7,330,964 B2 * | 2/2008 | Tran | G06F 9/30036 712/241 |
| 7,366,885 B1 | 4/2008 | Radhakrishnan et al. | |
| 7,937,574 B2 | 5/2011 | Clark et al. | |
| 2003/0079114 A1 | 4/2003 | Heishi et al. | |
| 2004/0193858 A1 | 9/2004 | Ahmad et al. | |
| 2006/0242645 A1 | 10/2006 | Codrescu et al. | |
| 2007/0011434 A1 | 1/2007 | Luick | |
| 2007/0174599 A1 | 7/2007 | Dowling | |
| 2011/0083000 A1 | 4/2011 | Rhoades et al. | |

FOREIGN PATENT DOCUMENTS

| | | |
|---|---|---|
| CN | 102707927 A | 10/2012 |
| JP | 2000509528 A | 7/2000 |
| JP | 2000259579 A | 9/2000 |
| JP | 2003520360 A | 7/2003 |
| JP | 2008090744 A | 4/2008 |
| WO | 9738372 A1 | 10/1997 |
| WO | 0045282 A1 | 8/2000 |

OTHER PUBLICATIONS

Krashinsky, Ronny et al., "The Vector-Thread Architecture", In Proceedings of the 31st Annual International Symposium on Computer Architecture, IEEE, 2004, pp. 84-90.
Fung, Wilson W.L. et al., "Dynamic Warp Formation and Scheduling for Efficient GPU Control Flow", In Proceedings of the 40th Annual International Symposium on Microarchitecture, 2007, 12 pages.
U.S. Appl. No. 13/753,098, filed Jan. 29, 2013, all pages.
Patterson, David A. et al. "Computer Architecture: A Quantitative Approach". Morgan Kaufmann Publishers, Inc. Second Edition, 1996. pp. 161-169.
Mayer, Herb. "Loop Instruction in x86". Mar. 17, 2003. 5 pages.
International Search Report and Written Opinion in International Application No. PCT/US2014/013474, mailed May 30, 2014, 11 pages.
Office Action in Korean Patent Application No. 10-2015-7023117, mailed Mar. 31, 2016, 13 pages.
Notification of the First Office Action in Chinese Application No. 201480013689.X, mailed Apr. 8, 2016, 9 pages.
Office Action in Japanese Patent Application No. 2015-555422, mailed Aug. 2, 2016, 28 pages.
Extended European Search Report in European Application No. 14746501.7, mailed Nov. 7, 2016, 11 pages.
Brunie et al, "Simultaneous Branch and Warp Interweaving for Sustained GPU Performance", Proceedings of the 39th Annual International Symposium on Computer Architecture, Jun. 9, 2012, pp. 49-60, IEEE Computer Society, Washington, DC, USA.
Meng et al, "Dynamic Warp Subdivision for Integrated Branch and Memory Divergence Tolerance", Proceedings of the 37th Annual International Symposium on Computer Architecture, Jun. 19, 2010, pp. 235-246, ACM, New York, NY, USA.
Wang et al., "Instruction Shuffle: Achieving MIMD-like Performance on SIMD Architectures", IEEE Computer Architecture Letters, Jul. 1, 2012, pp. 37-40, vol. 11, Issue 2, IEEE Computer Society, Washington, DC.
Notification of the Second Office Action in Chinese Application No. 201480013689.X, mailed Dec. 6, 2016, 9 pages.

* cited by examiner

SOLUTION TO DIVERGENT BRANCHES IN A SIMD CORE USING HARDWARE POINTERS

BACKGROUND

Technical Field

This disclosure relates to computing systems, and more particularly, to efficiently processing instructions in hardware parallel execution lanes within a processor.

Background

The parallelization of tasks is used to increase the throughput of computer systems. To this end, compilers may extract parallelized tasks from program code to execute in parallel on the system hardware. To increase parallel execution on the hardware, a processor may include multiple parallel execution lanes, such as in a single instruction multiple word (SIMD) micro-architecture. This type of micro-architecture may provide higher instruction throughput for particular software applications than a single-lane micro-architecture or a general-purpose micro-architecture. Some examples of tasks that benefit from a SIMD micro-architecture include video graphics rendering, cryptography, and garbage collection.

In many cases, particular software applications have data parallelism in which the execution of each work item, or parallel function call, is data dependent within itself. For example, a first work item may be data independent from a second work item, and each of the first and the second work items are simultaneously scheduled on separate parallel execution lanes within a SIMD micro-architecture. However, an amount of instructions executed within each of the first and the second work items may be data-dependent. A conditional test implemented as a branch instruction may pass for the first work item, but fail for the second work item dependent on the data for each work item.

The efficiency of parallel execution may be reduced as the second work item halts execution and waits as the first work item continues with its ongoing execution. The inefficiency grows when only a few work items continue execution due to passed tests whereas most of the work items are idle due to failed tests.

SUMMARY OF EMBODIMENTS

Systems and methods for efficiently processing instructions in hardware parallel execution lanes within a processor are contemplated. In various embodiments, a processor includes multiple parallel execution lanes within a single instruction multiple data (SIMD) micro-architecture. The processor may include multiple program counter (PC) registers. Additionally, the processor may include a size register for storing a size of a variable-length VLIW. Control logic within the processor may fetch in a cycle a number of instructions within a given VLIW equal to the stored size. The control logic may utilize a number of PC registers equal to the stored size to fetch the instructions within the given VLIW. A respective one of the multiple PC registers stores a pointer value pointing to a unique one of the multiple fetched instructions. The multiple execution lanes may simultaneously execute the number of instructions within the given VLIW.

The processor may additionally include a vector register with bit ranges associated with corresponding lanes of the multiple execution lanes. The bit ranges may store identifiers (ID's). A given ID may identify a given PC register of the multiple PC registers. The given PC register may store a pointer value pointing to a given instruction within a fetched VLIW for the associated lane to execute.

In some embodiments, a back-end compiler examines program instructions of a software application to identify loops and corresponding basic blocks. A divergent point within the loop may include a branch instruction. For example, an if-elseif-else construct, an if-else construct, a case construct and so forth may be used in the program instructions within the identified loop. Multiple trace paths may be traversed during execution of the translated and compiled program instructions between the divergent point and a corresponding convergent point.

During compilation, in response to a given divergent point within an identified loop, the compiler may generate code to insert with the translated and compiled program instructions. The inserted code when executed may determine a size of a next VLIW to process and determine the pointer values to store in corresponding PC registers. The updated PC registers may point to instructions intermingled from different basic blocks between the given divergence point and a corresponding convergence point. For example, if there is a Basic Block A with four instructions and a Basic Block B with six instructions between the given divergent point and the corresponding convergent point, the compiler may arrange the instructions into six VLIW's. The first four VLIW's may include one instruction from each of the Basic Block A and the Basic Block B. Two corresponding PC registers may be updated to point to these instructions. The first VLIW may include the first instruction from each of the Basic Block A and the Basic Block B. The second VLIW may include the second instruction from each of the Basic Block A and the Basic Block B, and so forth. The PC registers are updated once again to point to the associated instructions within each of the Basic Block A and the Basic Block B. The last two VLIW's may include an instruction from the Basic Block B grouped with a nop.

The assignment for a given lane may be based on branch direction found at runtime for the given lane at the given divergent point. Continuing with the above example, if the VLIW is the second VLIW created from the Basic Block A and the Basic Block B and the branch instruction for the given lane is taken, then the given lane may be assigned the second instruction in Basic Block A within the second VLIW. If the branch instruction is not taken, then the given lane may be assigned the second instruction in Basic Block B within the second VLIW. The associated PC register stores a pointer value pointing to the second instruction in either the Basic Block A or the Basic Block B based on the branch direction.

These and other embodiments will be further appreciated upon reference to the following description and drawings.

While the embodiments are susceptible to various modifications and alternative forms, specific embodiments are shown by way of example in the drawings and are herein described in detail. It should be understood, however, that drawings and detailed description thereto are not intended to limit the embodiments to the particular form disclosed, but on the contrary, the embodiments are to cover all modifications, equivalents and alternatives falling within the spirit and scope of the embodiments as defined by the appended claims.

DETAILED DESCRIPTION OF EMBODIMENT(S)

In the following description, numerous specific details are set forth to provide a thorough understanding of the embodiments. However, one having ordinary skill in the art should recognize that the embodiments might be practiced without these specific details. In some instances, well-known circuits, structures, and techniques have not been shown in detail to avoid obscuring the embodiments.

Figure 1:
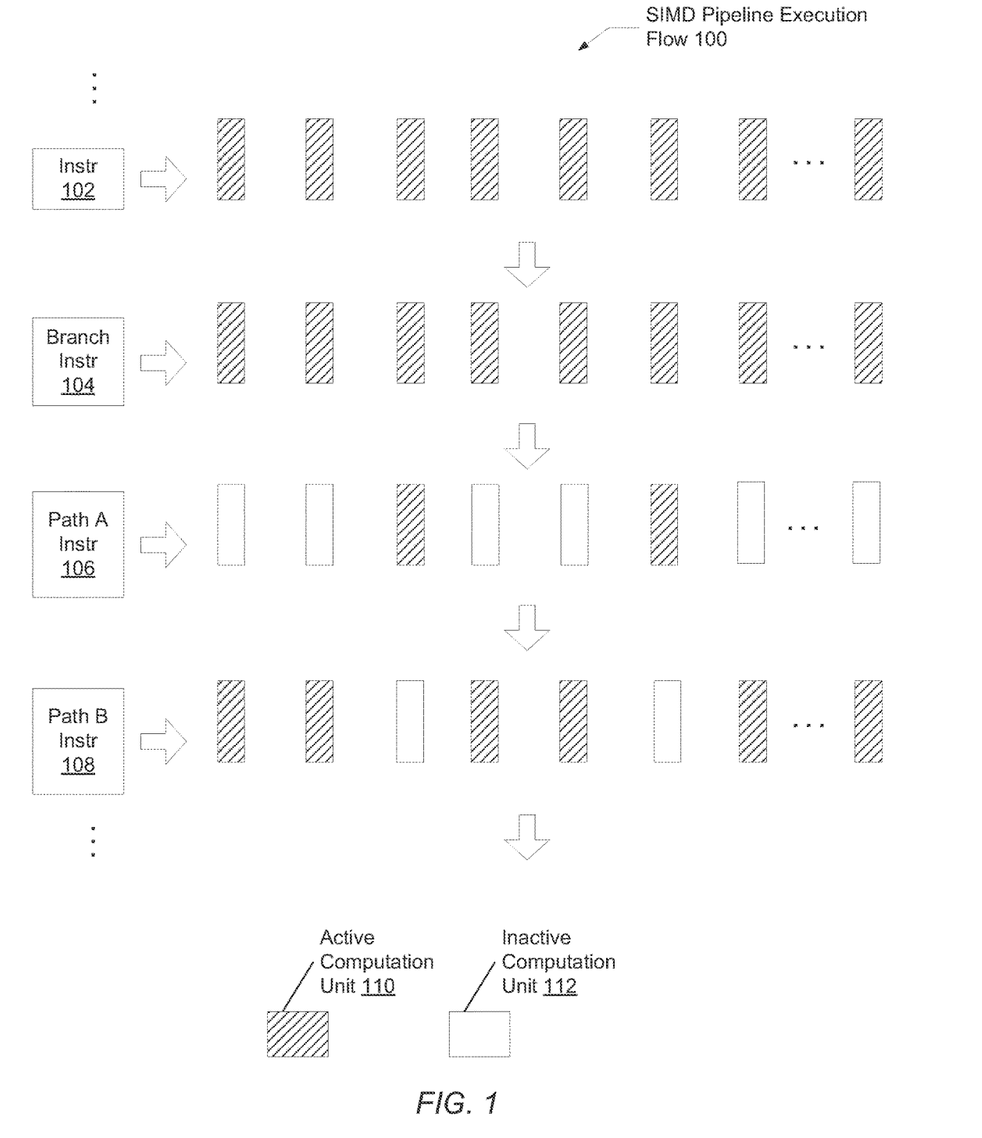
FIG. 1 is a generalized block diagram of one embodiment of single instruction multiple data (SIMD) pipeline execution flow.

Referring to FIG. 1, a generalized block diagram illustrating one embodiment of a single instruction multiple data (SIMD) pipeline execution flow 100 is shown. Instructions 102-108 may be fetched and sent to a SIMD pipeline with associated data. Multiple computation units within parallel vertical execution lanes are shown. Some of the computation units are active computation units 110. Other computation units are inactive computation units 112 due to being disabled during a given pipe stage. Control logic and storage elements, such as pipeline registers, are not shown for ease of illustration.

The hardware computation units include hardware that performs the execution of a given instruction of a given work-item with associated data. This hardware may include an arithmetic logic unit that is configured to perform addition, multiplication, zero detect, a bit-wise shift, division, video graphics and multimedia instructions or other operations known to those skilled in the art of processor design. Examples of processors with parallel execution lanes within a SIMD pipeline include graphics processing units (GPUs), digital signal processing (DSP), and so forth. In one embodiment, the SIMD pipeline may be located on a video card. In another embodiment, the SIMD pipeline may be integrated on the motherboard.

The SIMD pipeline may improve computing performance for a wide variety of data-parallel applications used in gaming, entertainment, science and medical fields. Such applications generally entail executing the same programs on large numbers of objects. Since each object is processed independently of other objects, but the same sequence of operations is used, a SIMD micro-architecture provides considerable performance enhancement. GPUs have also been considered for non-graphical calculations.

A software application may include a collection of function calls, or compute kernels, and internal functions. A software programmer may define the function calls, whereas the internal functions may be defined in a given library. For example, a software application may perform data processing on a two-dimensional (2D) array of data, such as an image file. The software application may perform an algorithm developed by a software programmer on a pixel-by-pixel basis of a 2D image or an element-by-element basis of a two-dimensional matrix. A given function call may be invoked over an index space. An index space may also be referred to as a dimensional space. For a data-parallel software application, an N-Dimensional computation domain may define a one-, two-, or three-dimensional space, or index space. An example is the pixels within the 2D image.

A function call may be matched with one or more records of data to produce one or more work-items of computation. Therefore, two or more work-items may utilize the same instructions of the single function call, but operate on different records of data. A function call may include control flow transfer instructions that create forks, whereas a fork in a computer program typically creates a software thread, by common definition. A given instance of the function call at a given point in the index space may be referred to as a "work-item". A work-item may also be referred to as a work unit. Continuing with the above example, a work-item may operate with the one or more instructions in the function call on a record of data corresponding to a given pixel (a given index) of the 2D image. Typically, work-items have an associated unique identifier (ID).

The index space may define a total number of work-items that execute in parallel if there is sufficient hardware support. For example, the index space may define a number of 280 work-items, but a GPU may support the simultaneous execution of 64 work-items at any given time. The total number of work-items may define a global work size. The work-items may be further grouped into work groups. Each work group may have a unique identifier (ID). The work-items within a given work group may be able to communicate with each other and synchronize execution and coordinate memory accesses. A number of work-items may be clustered into a wave front for simultaneous execution on a GPU in a SIMD manner. Regarding the example above for 280 total work-items, a wave front may include 64 work-items.

Instructions 102-108 may be fetched and enter a SIMD pipeline with associated data. Instruction 104 may be a control flow transfer instruction, such as a conditional branch. The instruction 106 may be a first instruction in a path executed when the condition is true. The instruction 108 may be a first instruction in a path executed when the condition is false. For example, the branch instruction 104 may be associated with an IF statement in a high-level language program. The instruction 106 may be associated with a THEN statement in the high-level language program. The instruction 108 may be associated with an ELSE statement in the high-level language program.

Each of the computation units within a given row may be a same computation unit. Each of these computation units may operate on a same instruction, but different data associated with a different work-item. As shown, some of the work-items pass the test provided by the conditional branch instruction 104 and other work-items fail the test. Control logic within the SIMD pipeline may execute each of the available paths and selectively disable the execution units, such as the computation units, corresponding to work-items that did not choose the current path. For example, during execution of an If-Then-Else construct statement, within each column of a SIMD architecture are execution units configured to execute the "Then" (Path A) and the "Else" (Path B) paths.

The efficiency of parallel execution may be reduced as the first and the second work-items pause execution and wait as the third work-item continues with its ongoing execution. Therefore, not all of the computation units are active computation units 110 in a given row after execution of the branch instruction 104. As shown, one or more computation units are inactive computation units 112 that have been disabled for execution. If a large number of computation units are inactive during a given pipe stage, the efficiency and throughput of the SIMD core is reduced. In one embodiment, an "Else" path is a return for the function call. Execution of the function call ends and the corresponding work-item becomes idle. However, neighboring work-items in the SIMD core may continue executing.

Figure 2:
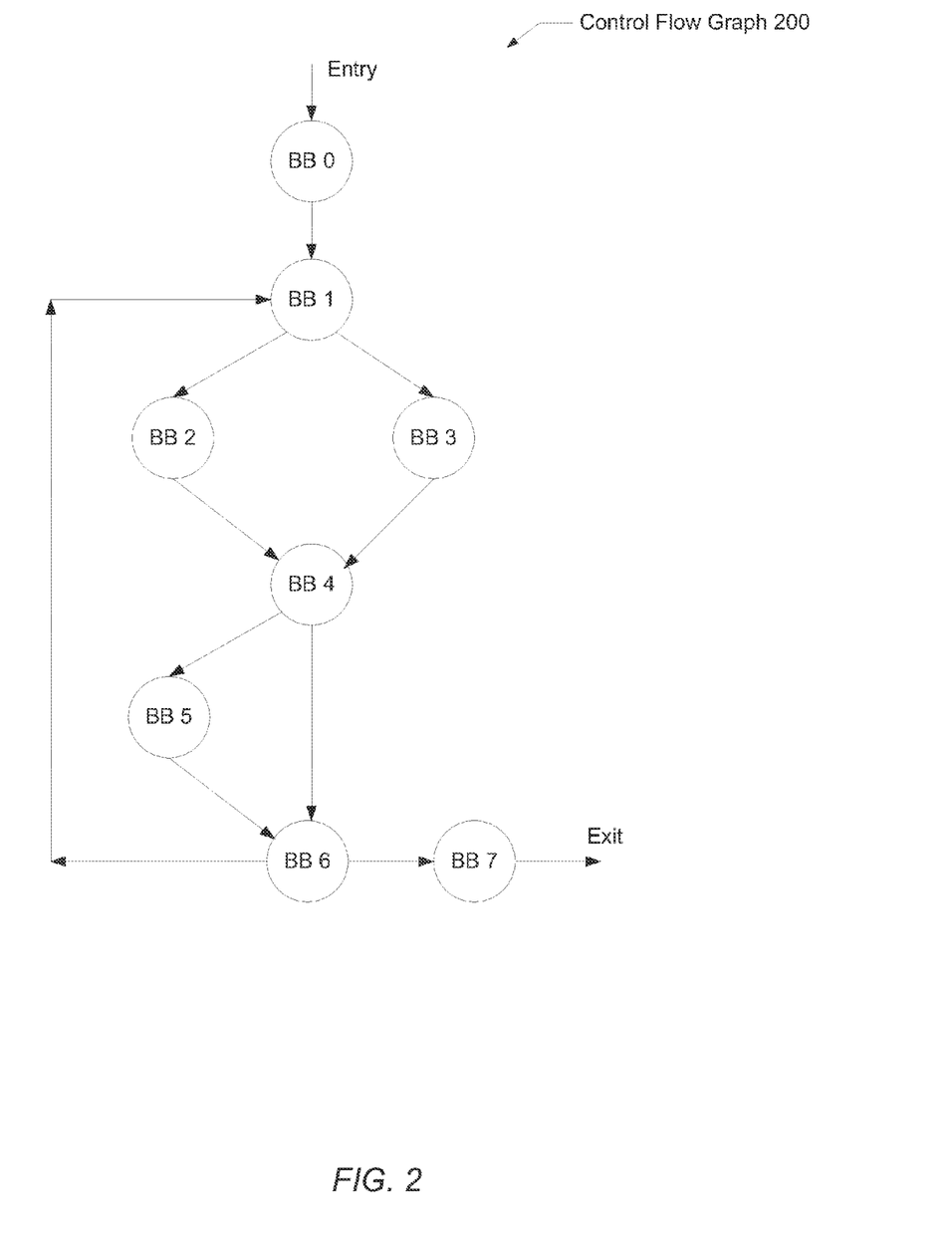
FIG. 2 is a generalized block diagram of one embodiment of a control flow graph.

Turning now to FIG. 2, a generalized block diagram illustrating one embodiment of a control flow graph 200 is shown. Generally speaking, control flow graphs may be used by compiler optimizers and static analysis tools. The control flow graph 200 may represent all paths that might be traversed through the program or a portion of the program during its execution. In a control flow graph, each node in the graph represents a basic block. Most representations include an entry block, through which control enters into the control flow graph, and an exit block, through which control leaves the control flow graph.

During compilation, a software application may provide the control flow graph 200 with eight basic blocks (BB's) numbered from basic block 0 (BB 0) to basic block 7 (BB 7). Although eight basic blocks are shown, in other examples, another number of basic blocks may be used. For the control flow graph 200, basic block 1 is the entry block and basic block 6 is the exit block. Each one of the basic blocks 0-7 is a straight-line sequence of instructions with one entry point and one exit point. The control flow graph 200 may represent a loop. Inside the loop, the control flow graph 200 may represent an IF-THEN-ELSE construct with basic blocks 1-4 and an IF construct with basic blocks 4-6.

Figure 3:
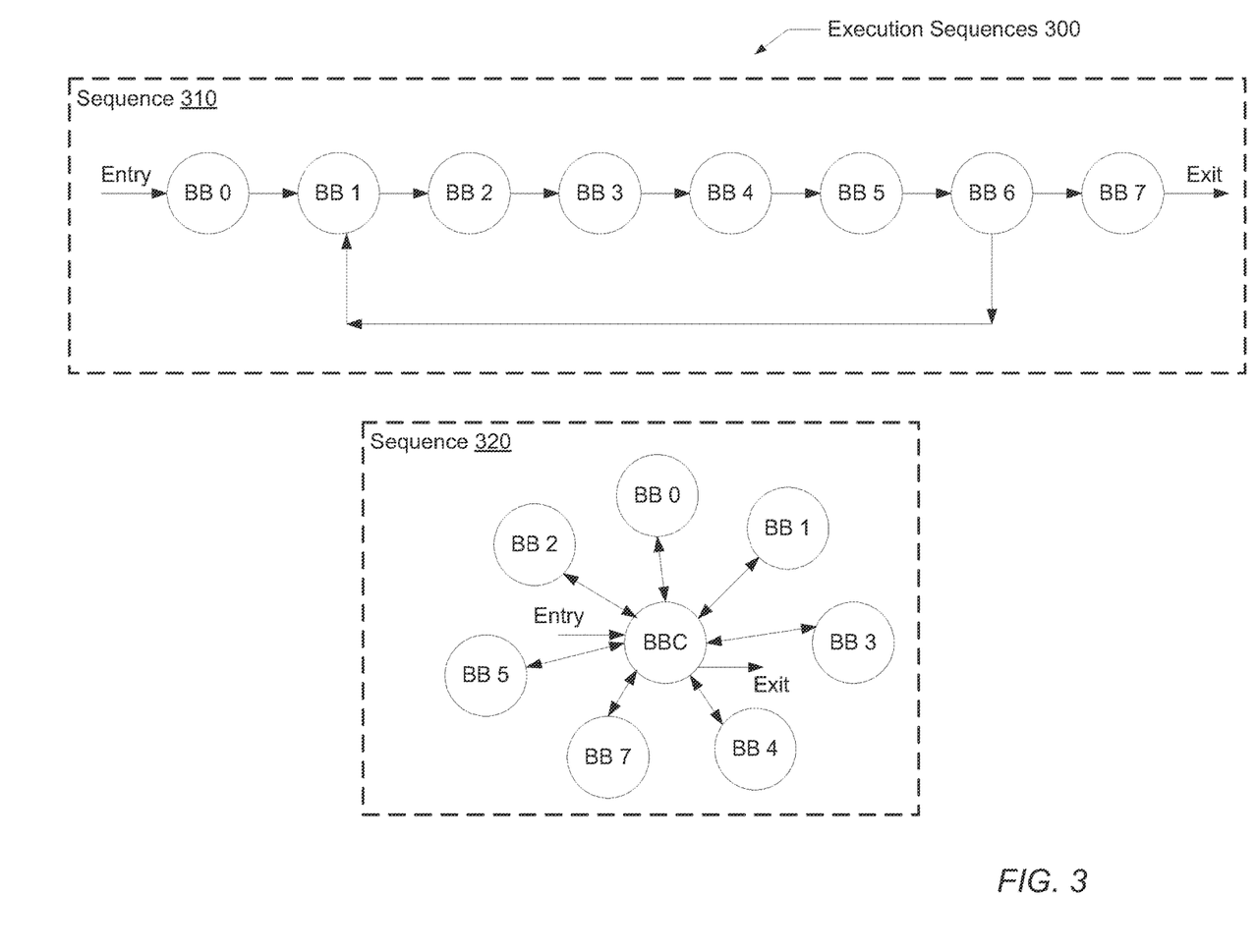
FIG. 3 is a generalized block diagram of one embodiment of execution sequences for a control flow graph.

Referring now to FIG. 3, a generalized block diagram illustrating one embodiment of execution sequences 300 for a control flow graph is shown. The execution sequence 310 represents a typical execution sequence for the previously shown control flow graph 200 when assigned to a SIMD pipeline. The execution time for a single loop iteration is the sum of the execution times of each of the basic blocks within the loop, such as BB 1 to BB 6. However, for a given work-item and corresponding hardware execution lane, only one of BB 2 and BB 3 is executed. Similarly, BB 5 may be skipped for the given work-item. Although particular basic blocks may not be executed for the given work-item, the associated execution times still contribute to the total sum of execution time for the loop iteration.

The execution sequence 320 represents an alternative execution sequence for the previously shown control flow graph 200 when assigned to a modified SIMD pipeline. The execution time for a single loop iteration is the sum of the execution times of the basic blocks actually executed in the single loop iteration, rather than the sum of the execution times of each of the basic blocks within the loop. The execution sequence 320 transforms the execution of the control flow graph 200. The compiler may perform this transformation during compilation of the source code to object code.

In some embodiments, the compiler generates code at the end of each basic block wherein when executed the code identifies a next basic block to execute. The generated code may be inserted at the end of a basic block. Alternatively, a branch instruction may be inserted at the end of a basic block to transfer control flow to the additional code before transferring control to the next basic block. The additional code is represented by BBC, which refers to a central basic block. When executed, each branching basic block, such as BB 1, BB 4 and BB 6, identifies a next basic block to have control transferred to it. The identification is based on the branch resolution, which is further based on a particular record of data and the branch instruction. When executed, the BBC receives the address of the target basic block from each work-item and sets up thread registers to execute the respective target basic block. Across the different work-items being executed in the SIMD pipeline, a given work-item has a single target for a control flow transfer instruction, such as branch, jump, and case statements.

In the execution sequence 320, at the completion of BB 4, a first work-item may branch to BB 5 and pass the corresponding address to BBC. At the completion of BB 4, a second work-item may branch to BB 6 and pass the corresponding address to BBC. The target processor may create a dynamic very large instruction word (DVLIW) that includes an instruction from each of the target basic blocks to be simultaneously executed. When executed by the target processor, the generated code by the compiler may update a size of a next DVLIW to execute corresponding to a next program counter (PC) value. Additionally, when executed, the generated code may update a mapping between a given work-item being executed in a given parallel execution lane and a program counter identifier (PC ID) pointing to a given PC register. The given PC register may hold the pointer or address pointing to one an associated one of the instructions within a next DVLIW, which is to be fetched.

Figure 4:
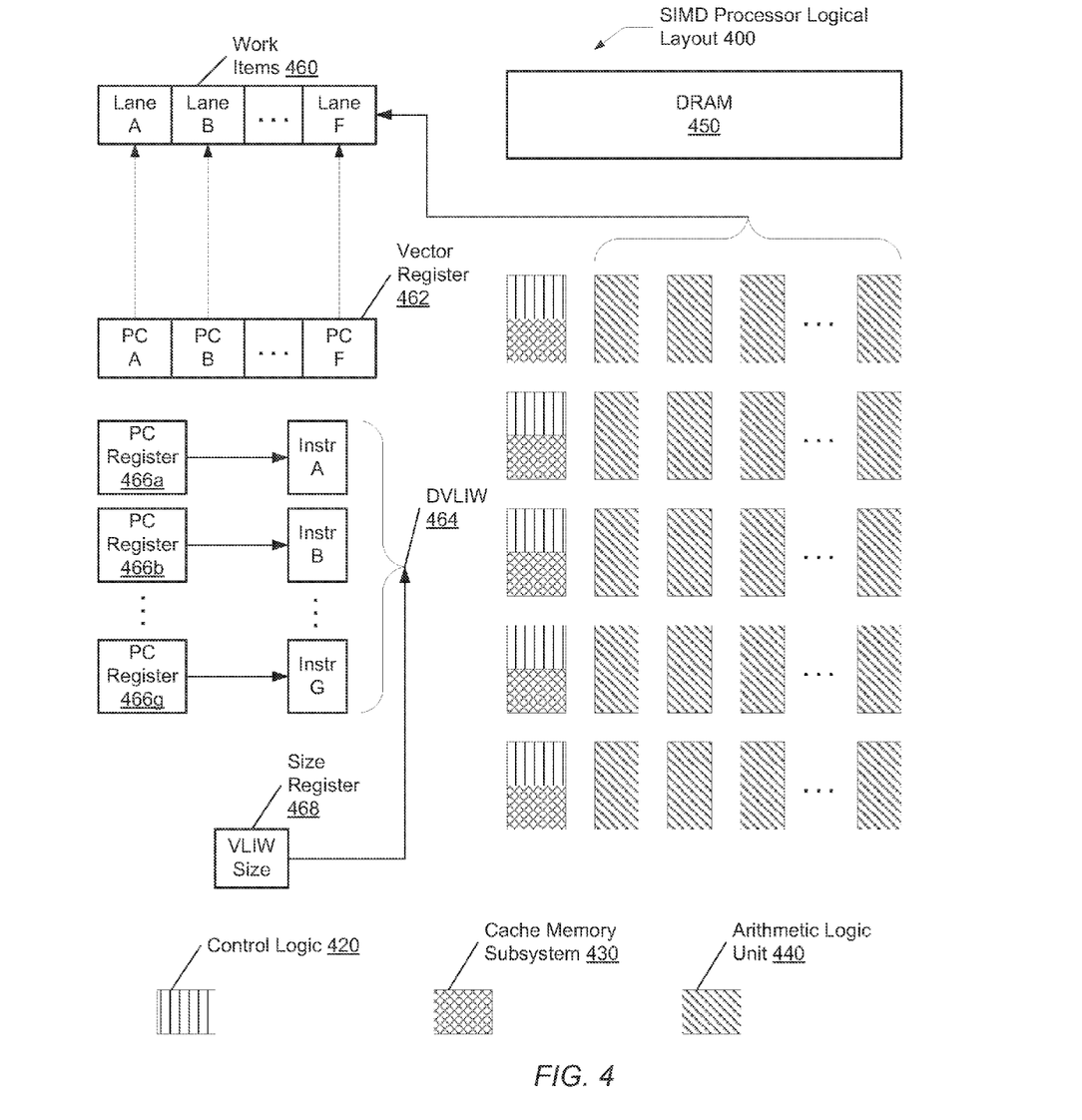
FIG. 4 is a generalized block diagram of one embodiment of a logical layout of a SIMD micro-architecture for a processor.

Referring to FIG. 4, a generalized block diagram illustrating one embodiment of a logical layout 400 of a SIMD micro-architecture for a processor is shown. The processor has a dynamic random access memory (DRAM) 450 for storage of data and instructions. In some embodiments, a given level of a cache memory subsystem is used in addition to the DRAM. As shown, the processor may have a relatively small cache memory subsystem 430 grouped with control logic 420 for each row of computation units. The data flow within the processor may be pipelined, although storage elements, such as pipeline registers, are not shown in order to simplify the illustration. In a given pipeline stage, a computation unit may be unused if an associated instruction in this stage is not executed based on a previous failed test, such as a not-taken branch.

The SIMD pipeline includes work-items 460 comprising lanes A-F. Each one of the lanes A-F may correspond to a respective one of the vertical parallel hardware lanes comprising computation units. The SIMD pipeline includes multiple program counter (PC) registers 466a-466g. Each one of the PC registers 466a-466g may store a pointer value or address pointing to an associated instruction within a next DVLIW to fetch from memory, such as an i-cache. The dynamic very large instruction word (DVLIW) 464 includes multiple instructions, such as Instr A to Instr G. Each one of the instructions Instr A to Instr G within the DVLIW 464 represents an executing trace in the control flow graph. The DVLIW 464 may be built and laid out based on the valid pointer values stored in the PC registers 466a-466g. The processor comprising the SIMD pipeline may further include a size register 468 that stores the size, or the length, of the DVLIW 464. In some embodiments, the size may be an integer representing a number of instructions within the variable length DVLIW.

The pipeline may additionally include a vector register 462. The vector register 462 may include an entry, a field, or a bit range for each one of the parallel execution lanes. Each entry may include a total number of bits comprising a first number of bits to identify a given one of the PC registers 466a-466g and a second number of bits to support special codes. The special codes may identify wait or sleep states, a loop exit state, a barrier identifier for stalling execution other than for ending a loop, an event identifier, and so forth.

In one example, lane B within the work-items 460 may correspond to the second vertical execution lane from the left in the SIMD pipeline. The "PC B" stored in the vector register 462 may be associated with lane B and point to the PC register 466b. The PC register 466b may stored an address or pointer value that points to Instr B within the DVLIW 464. Therefore, lane B may receive Instr B to process.

Although not shown, the instruction cache (i-cache) may include multiple ports for simultaneously receiving multiple PC values. In a given clock cycle, the i-cache may simultaneously fetch one or more instructions in the DVLIW 464. The i-cache may use the multiple received valid PC values stored in the PC registers 466a-466g. The i-cache may receive the size stored in the size register 468 in addition to the multiple pointers or addresses stored in the PC registers 466a-466g. The I-cache may have multiple data ports for accessing one or more instructions in a same valid cache line or cache set. Again, the number of valid instructions to fetch may equal the received size from the size register 468.

Figure 5:
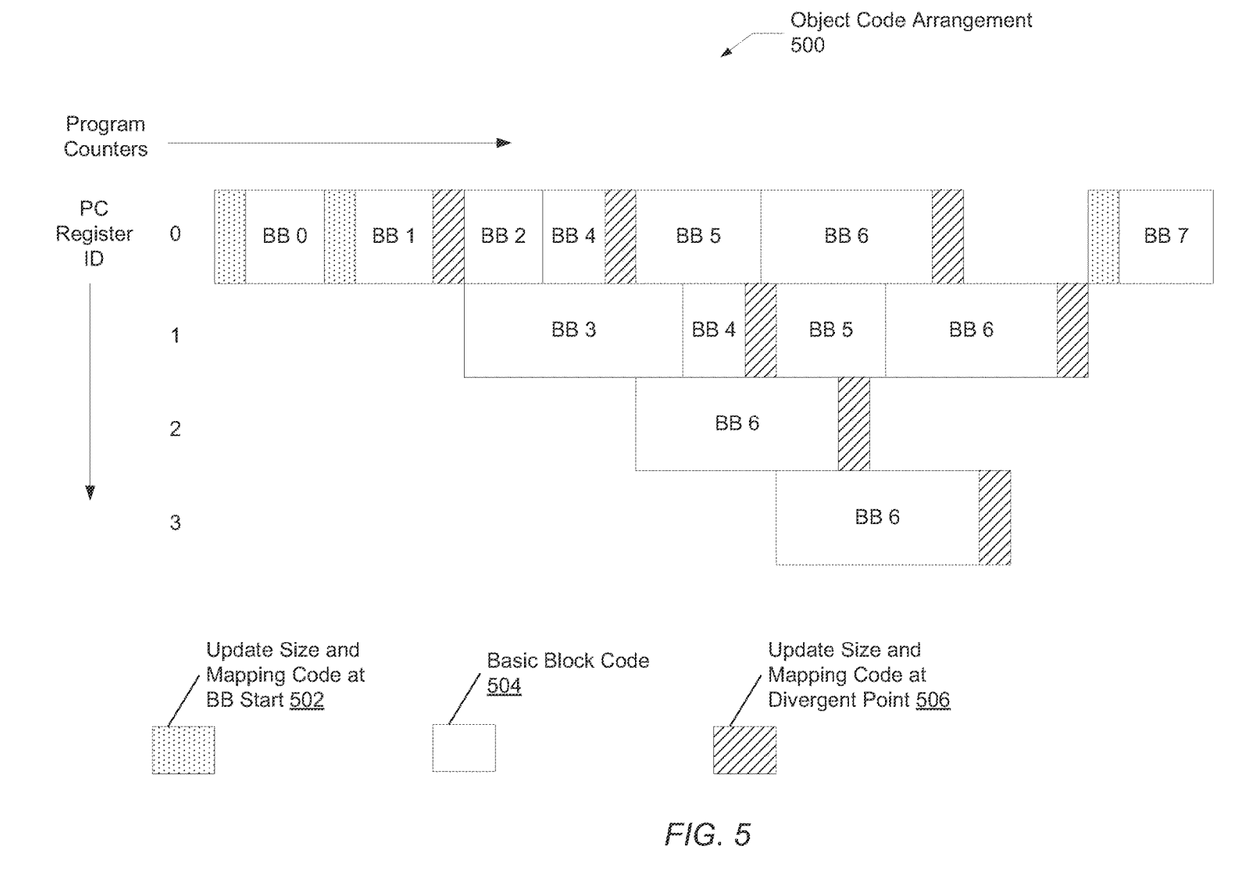
FIG. 5 is a generalized block diagram of one embodiment of an object code arrangement.

Referring now to FIG. 5, a generalized block diagram of one embodiment illustrating code arrangement 500 used for execution is shown. The target processor with a SIMD pipeline may build DVLIW's using pointer or address values stored in multiple PC registers. The target process may execute the resulting DVLIW with the records of data associated with each of the work-items. The code arrangement 500 illustrates the executed code layout that may be created by the processor for the control flow graph 200 and the accompanying execution sequence 320 shown in FIG. 2 and FIG. 3, respectively. The code arrangement 500 illustrates the assignment of PC registers to the instructions within DVLIW's at runtime for the execution sequence 320. In this example, four PC registers are used.

Basic block code 504 represents code for respective basic blocks. For example, one copy of code for basic blocks 0-3 and 7 are shown to be executed in the arrangement 500. Two copies of code for basic blocks 4-5 are shown being executed in the arrangement 500. Four copies of code for basic block 6 are being executed in arrangement 500.

The code 502 may be generated and inserted by the compiler for entries of a region, such as a loop. When later executed, the code 502 may update the size of a next DVLIW and update mappings between the instructions within a fetched DVLIW and the PC registers in the target processor. For example, the size and vector registers within the target processor may have their stored contents updated by the executed code 502. As shown, the code 502 may be inserted at the beginning of basic blocks 0, 1 and 7.

The code 506 may be generated and inserted by the compiler for the transitions into divergent points, such as the end of basic blocks 1, 4 and 6. When later executed, the code 506 may determine the DVLIW size changes and corresponding mapping changes between the instructions within a fetched DVLIW and the PC registers in the target processor. Therefore, the size and mappings are updated at divergent and convergent points within the control flow graph. The compiler identifies the points where the size of the DVLIW's change and where the mappings change. Using the notation BBC (0, 1), wherein the first index indicates a trace identifier (ID) and the second index indicates a basic block (BB) ID, the identified points for inserting code 506 may exist at BBC (0, 1), BBC (0, 4), BBC (0, 6), BBC (1, 4), BBC (1, 6), BBC (2, 6) and BBC (3, 6). The trace ID in this example may be the same as a corresponding PC register.

At the beginning of executing the control flow graph 200, the code 502 performs initialization steps and may set the DVLIW size to 1. The PC ID's within each of the entries of the vector register may be set to point to a same instruction within the BB 0, such as PC 0. The PC 0 may store the value 0 or another appropriate starting address. As shown, there are four possible parallel traces, but the number of work-items may be independent. For example, the SIMD pipeline may have 8, 16, 64 or another number of parallel execution lanes for processing assigned work-items. Each of the work-items within the SIMD pipeline has a stored PC ID of 0 in the vector register and will execute a same instruction. This same instruction for each work-item is an instruction from BB 0. The instructions in BB 0 are executed one-by-one by each work-item and the PC is incremented after each instruction fetch.

After execution of BB 0 is complete, the loop entry block, BB 1, is next to be processed. The code 502 at the start of BB 1 maintains the DVLIW size as 1 and the PC ID for each work-item as 0. The PC ID's within each of the entries of the vector register may be set to point to a same instruction within the BB 1, such as PC 0. The PC may remain as an incremented value from the value reached at the completion of BB 0. The instructions in BB 1 are executed one-by-one by each work-item and the PC is incremented after each instruction fetch.

When executed, the code 506 at BBC (0, 1) which is at the end of BB 1, changes the stored DVLIW size from 1 to 2. The instructions within BB 3 are now added to the fetched DVLIW's. Additionally, when executed, the code 506 at BBC (0, 1) sets the entries in the vector register for work-items branching to BB 3 to store the value PC 1. The entries in the vector register for work-items branching to BB 2 remain unchanged by continuing to store PC 0. Although the values of 0 and 1 are used in this manner, other numerical values may be used to set the corresponding indications and mappings. At this point, the DVLIW has two instructions, which are intermingled fetched instructions from the two separate basic blocks BB 2 and BB 3. As the multiple PC registers continues to be incremented, the fetched DVLIW's continue to include intermingled instructions from these two basic blocks until the processing of BB 2 completes.

At the completion of BB 2, the DVLIW size remains 2. The stored PC ID's in the vector register also maintain their values. However, now PC 0 corresponds to instructions in BB 4, rather than the BB 2. At the completion of BBC (0, 4), the code 506 at the end of BB 4 in trace 0 updates the size register to store 3 and updates the entries in the vector register for work-items branching to BB 6 to store PC 2. Three instructions are fetched from the i-cache after sending the multiple addresses stored in the multiple PC registers and the stored size to the i-cache. A DVLIW of length 3 is built in the target process from the fetched instructions. The DVLIW's include intermingled instructions from BB 3 or BB 4, BB 5 and BB 6.

Work-items with an associated stored PC ID of 0 in the vector register obtain fetched instructions from BB (0, 5). Work-items with an associated stored PC ID of 1 in the vector register obtain results from either BB (1, 3) or BB (1, 4) depending on how far the address has incremented. Work-items with an associated stored PC ID of 2 in the vector register obtain fetched instructions from BB (2, 6).

At the completion of BBC (1, 4), the code 506 at the end of BB 4 in trace 1 updates the size register to store 4 and updates the entries for work-items branching to BB (3, 6) to store a PC ID of 3. Four instructions are fetched from the i-cache after sending the multiple addresses stored in the multiple PC registers and the stored size to the i-cache. A DVLIW of length 4 is built within the target processor from the fetched instructions. The DVLIW's include intermingled instructions from a first copy of BB 6, a single copy of BB 5, a second copy of BB 6 and a third copy of BB 6. Work-items with an associated stored PC ID of 0 in the vector register obtain fetched instructions from BB (0, 6). Work-items with an associated stored PC ID of 1 in the vector register obtain results from either BB (1, 5). Work-items with an associated stored PC ID of 2 in the vector register obtain fetched instructions from BB (2, 6). Work-items with an associated stored PC ID of 3 in the vector register obtain fetched instructions from BB (3, 6).

For each of BB (0, 6), BB (1, 6), BB (2, 6) and BB (3, 6), control flow at the end of BB 6 may either return to BB 1 for another iteration of the loop or terminate from the loop. An associated branch instruction and data within a corresponding record will determine at runtime the control flow direction. Some work-items may continue with another iteration and other work-items may exit the loop. A special code status may be stored in a corresponding entry in the vector register to indicate which path is taken. In response to determining a given work-item will continue another loop iteration and at least one other work-item of the multiple work-items is still processing code for an associated basic block, a sleep state encoding may be stored in the associated entry in the vector register for the given work-item.

In response to determining the given work-item will exit the loop, an exit state encoding may be stored in the associated entry in the vector register for the given work-item. Each of the sleep and exit state encodings is unique from the PC ID's used during loop iterations and unique from one another. In some embodiments, for the given work-item that is in the sleep or the exit state, the code 506 halts execution of the given work-item and stores at least a next program counter (PC) and the work-item identifier (ID) in memory, such as a stack memory for fast retrieval.

The code 506 at the end of BB 6 may check the status of each of the work-items. In response to determining each work-item is in the sleep state or each work-item is in the exit state, the processor while executing code 506 may restart execution for each work-item by branching to a respective stored next PC. In response to determining each work-item is halted and at least one work-item is in a different state than another work-item, the processor while executing code 506 may restart execution for only work-items in a sleep state by branching to a respective stored next PC. If at least one work-item is still processing instructions within a basic block in the loop, then execution continues for the at least one work-item while the other work-items in a special state wait. Work-items leaving the sleep state branch back to BB 1. Additionally, the code 502 at the beginning of BB 1 reinitializes the vector and size registers. Work-items leaving the exit state branch to BB 7. Additionally, the code 502 at the beginning of BB 7 accordingly reinitializes the vector and size registers.

In the above example, the loop has a single exit. In other cases with multiple exits, corresponding state information, such as at least a next PC and a work-item ID, may be stored in memory, such as a stack. Later, the state information may be retrieved, such as popping them from the stack, for restarts. Both work-items that are in a sleep state or an exit state may have state information stored in memory, such as a stack. As different work-items may exit the loop at different loop iterations, multiple entries with state information may be placed in memory, such as the stack. At restart time, when executed, the compiler-generated code may pop the state information and combine information for work-items that restart from a same next PC.

Figure 6:
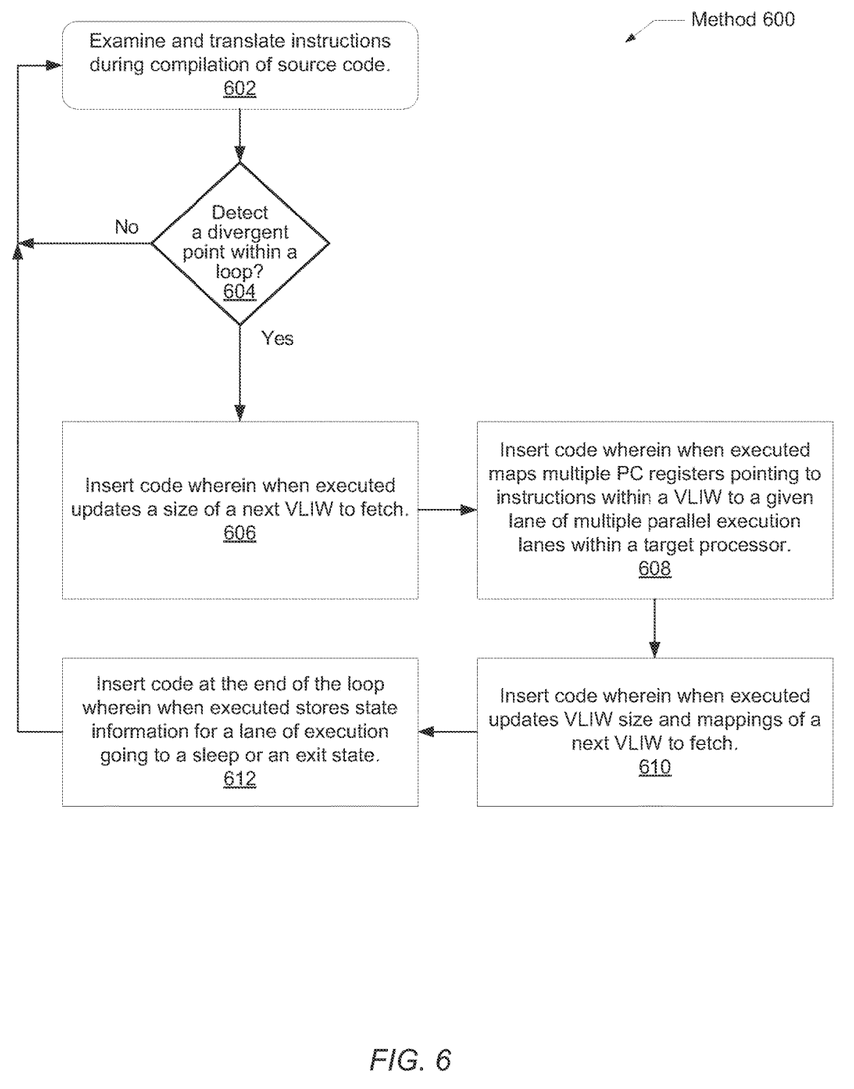
FIG. 6 is a generalized flow diagram of one embodiment of a method for optimizing parallel execution of multiple work-items in a processor with compiler techniques.

Turning now to FIG. 6, one embodiment of a method 600 for optimizing parallel execution of multiple work-items in a processor with compiler techniques is shown. For purposes of discussion, the steps in this embodiment and subsequent embodiments of methods described later are shown in sequential order. However, in other embodiments some steps may occur in a different order than shown, some steps may be performed concurrently, some steps may be combined with other steps, and some steps may be absent.

In block 602, a software program or subroutine may be located and analyzed. The program code may be written by a designer in a high-level language such as C or another language. This software program may be written for compilation and execution of a parallel-data application, such as in the gaming, business, medical and other fields. Program code may refer to any portion of a software application, subroutine, dynamic linked library, or otherwise. A pathname may be entered at a command prompt by a user. Alternatively, a pathname may be read from a given directory location, or other, in order to begin compiling the source code. Instructions within the program code may be examined, translated, optimized, and further processed during compilation.

In some embodiments, the source code is statically compiled. In such embodiments, during a front-end compilation, the source code may be translated to an intermediate representation (IR). A back-end compilation step may translate the IR to machine code. The static back-end compilation may perform more transformations and optimizations. In other embodiments, the source code is compiled with a Just-In-Time (JIT) method. The JIT method may generate an appropriate binary code after obtaining the system configuration. With either method, the compiler may identify function calls, loops, traces within the loops, and basic blocks in the program code. One or more control flow graphs may be constructed during program analysis.

In various embodiments, the program code is compiled on a processor, such as a general-purpose processor. The program code may be compiled for a target processor, which includes a parallel micro-architecture, such as a SIMD micro-architecture. One or more associated record(s) of data may be assigned to a function call to produce one or more work-items.

Prior to detecting any divergent points in the program code, the compiler may lay out the analyzed and translated instructions in memory as they appear in the program code. Essentially, the compiler may be creating VLIW's with a size of one. If the compiler detects a divergent point within an identified loop (conditional block 604), then in block 606, generated code may be inserted wherein when executed updates a size of a next VLIW to fetch. The compiler may setup code and records of data in a manner to allow the target processor to create very large instruction words (VLIW's). The compiler may track the program counter (PC) values of instructions intermingled from multiple basic blocks between the divergent point and a corresponding convergent point. The multiple PC values may be later conveyed to the target processor when the generated code is executed. One or more associated record(s) of data may be tracked to accompany the intermingled instructions within the VLIW's to produce one or more associated work-items.

In block 608, the compiler may insert code wherein when executed maps multiple PC registers pointing to instructions within a VLIW to a given lane of multiple parallel execution lanes within the target processor. Alternatively, the mapping may be between the offset and a work-item ID. In block 610, the compiler may insert generated code wherein when executed updates the VLIW size and the mappings of a next VLIW to fetch. In block 612, generated code may be inserted at the end of the loop wherein when executed stores state information for a lane of execution going to a sleep or an exit state.

Figure 7:
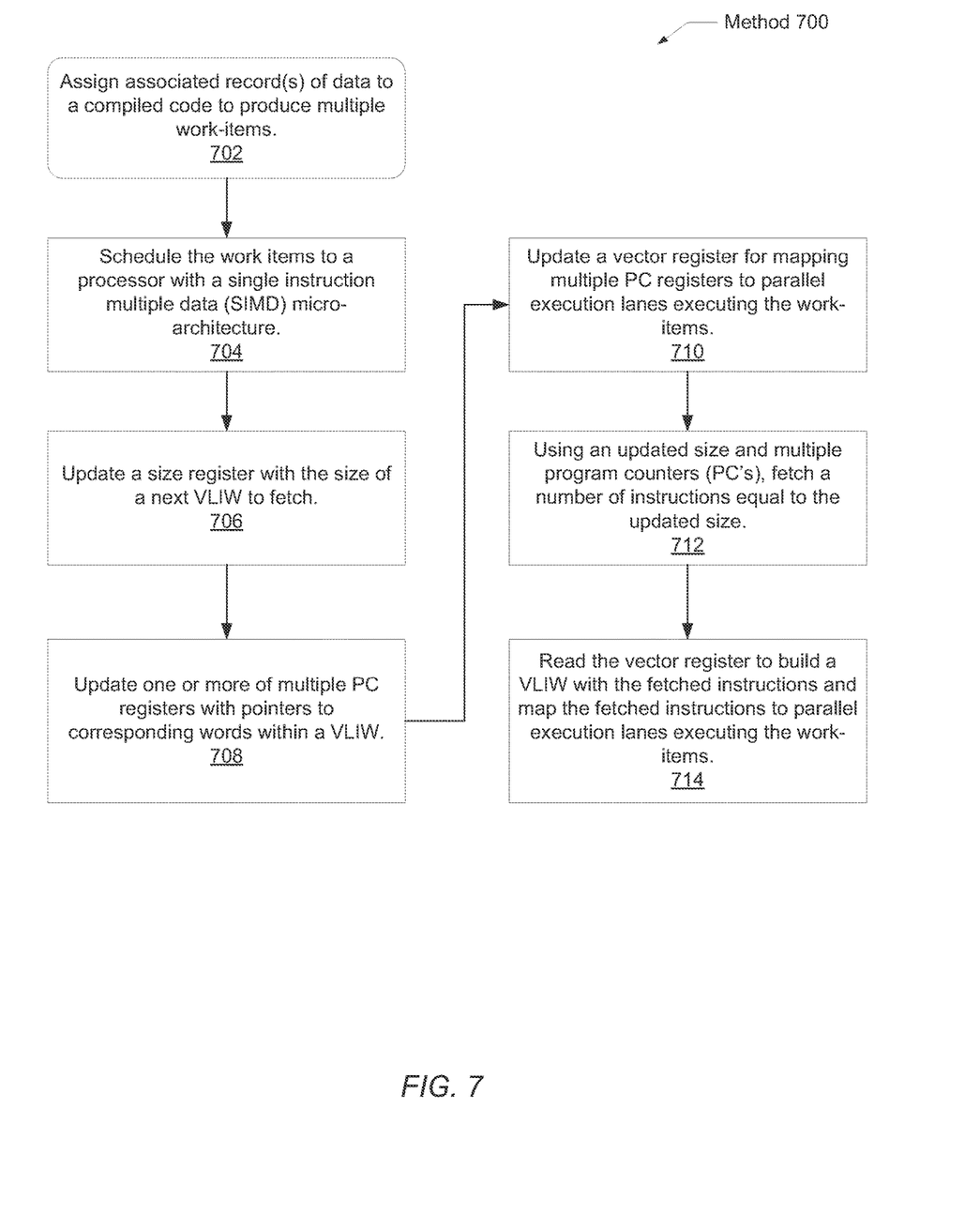
FIG. 7 is a generalized flow diagram of one embodiment of a method for optimizing parallel execution of multiple work-items in a processor using hardware techniques.

Referring now to FIG. 7, one embodiment of a method 700 for optimizing parallel execution of multiple work-items in a processor using hardware techniques is shown. For purposes of discussion, the steps in this embodiment and subsequent embodiments of methods described later are shown in sequential order. However, in other embodiments some steps may occur in a different order than shown, some steps may be performed concurrently, some steps may be combined with other steps, and some steps may be absent.

In block 702, associated record(s) of data are assigned to compiled code to produce multiple work-items. In some embodiments, the operating system may perform the assignments. In block 704, the work-items are scheduled to a target processor with a single instruction multiple data (SIMD) micro-architecture. In block 706, a size register with the size of a next VLIW to fetch is updated. In block 708, one or more of multiple PC registers are updated. The multiple PC registers may store pointers or addresses to corresponding words within a VLIW to be built.

In block 710, a vector register used for mapping multiple PC registers to parallel execution lanes executing the work-items is updated. Particular fields or entries corresponding to a given one of the parallel execution lanes may store a PC identifier (ID). The PC ID may identify one of the multiple PC registers to read for the address of an instruction to process by the associated execution lane. Using the updated size and the multiple program counters (PC's), in block 712, the processor may fetch a number of instructions equal to the updated size from the i-cache. The fetched instructions may be from separate basic blocks between a divergent point and a convergent point within a loop. In block 714, the target processor may read the vector register to build a VLIW with the fetched instructions. The mapping information stored in the vector register may determine for a given work-item and corresponding execution lane which instruction in the VLIW to process. The target processor may map the fetched instructions to the parallel execution lanes executing the work-items.

Figure 8:
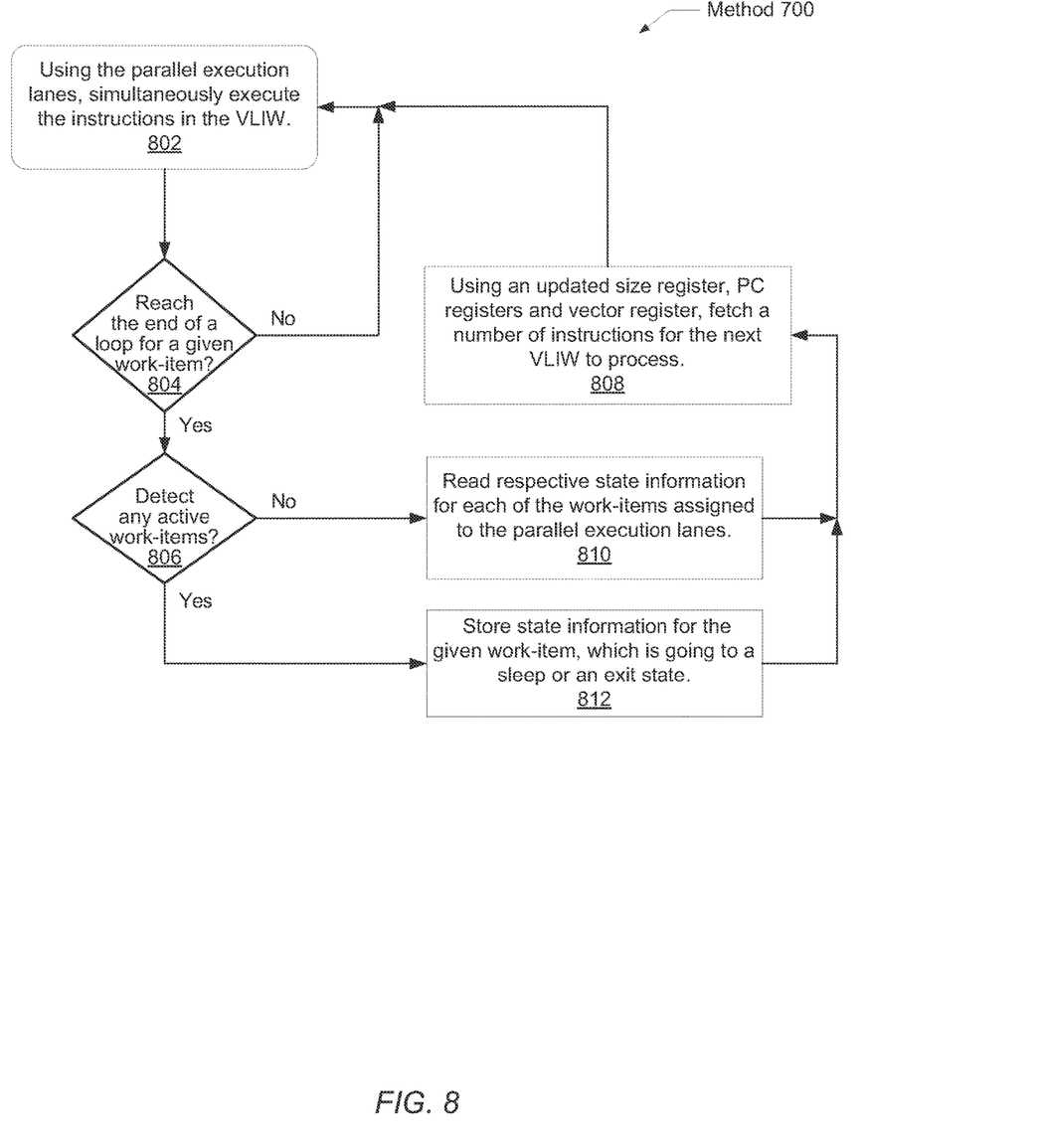
FIG. 8 is a generalized flow diagram of another embodiment of a method for optimizing parallel execution of multiple work-items in a processor using hardware techniques.

Referring now to FIG. 8, another embodiment of a method 800 for optimizing parallel execution of multiple work-items in a processor using hardware techniques is shown. For purposes of discussion, the steps in this embodiment and subsequent embodiments of methods described later are shown in sequential order. However, in other embodiments some steps may occur in a different order than shown, some steps may be performed concurrently, some steps may be combined with other steps, and some steps may be absent.

In block 802, the instructions in the built VLIW are simultaneously executed using the parallel execution lanes in the target processor. If the end of a loop is reached for a given work-item (conditional block 804) and if no work-items are detected to be active (conditional block 806), then in block 810, respective state information is read for each of the work-items assigned to the parallel execution lanes. The state information may include at least a next PC and a work-item ID. The state information may be used for continuing execution within the parallel execution lanes.

If the end of a loop is reached for a given work-item (conditional block 804) and if any work-item is detected to be active (conditional block 806), then in block 812, the state information for the given work-item is stored for later use. The given work-item may have execution halted and may be placed in a sleep or an exit state.

Figure 9:
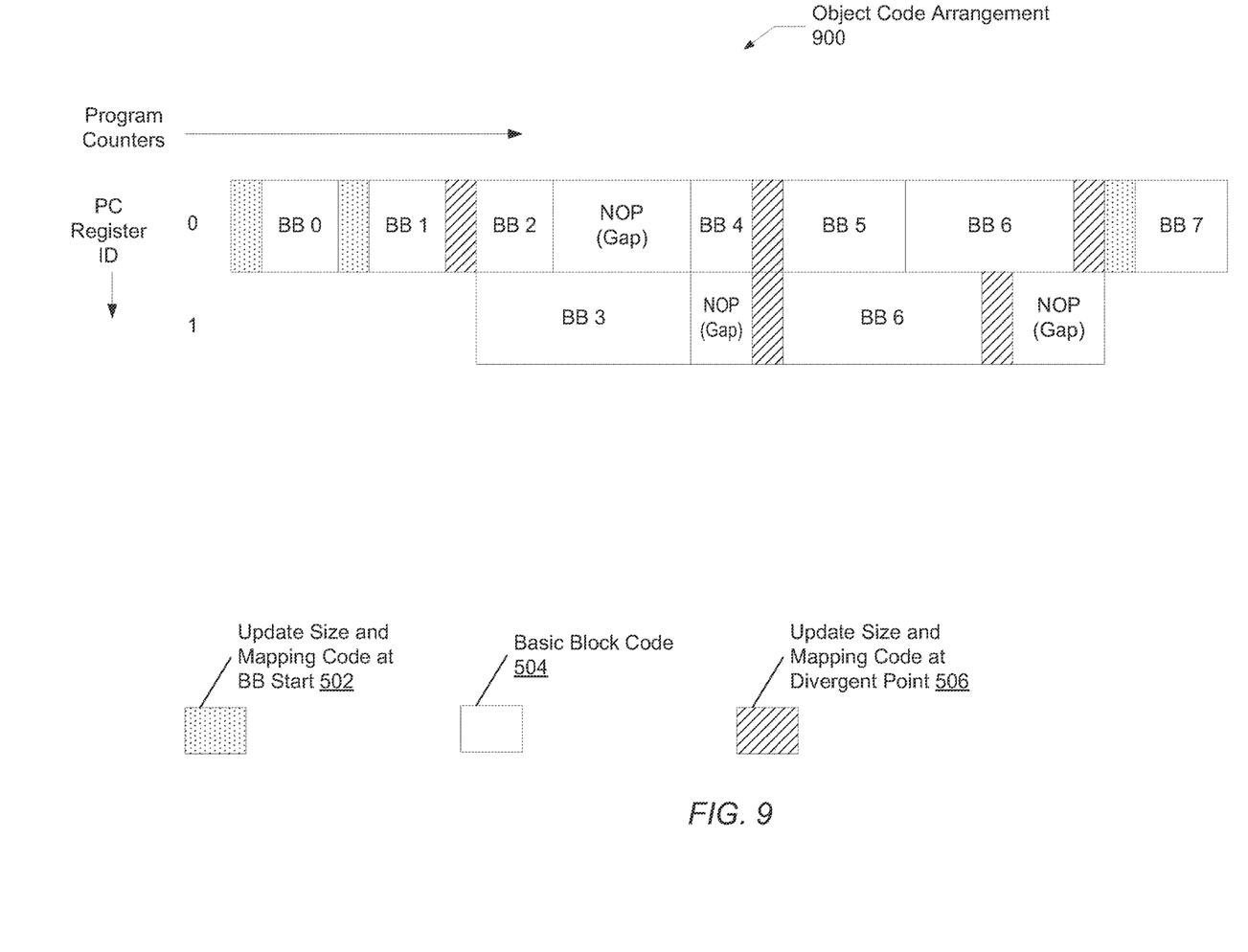
FIG. 9 is a generalized block diagram of another embodiment of an object code arrangement.

Referring now to FIG. 9, a generalized block diagram of another embodiment illustrating an object code arrangement 900 is shown. The code arrangement 900 illustrates one embodiment of an arrangement created by the processor when executing code for the control flow graph 200 and the accompanying execution sequence 320 shown in FIG. 2 and FIG. 3, respectively. The code 502-506 may perform the same functionality as previously described.

The sizes of the basic blocks are known at compile time. The compiler may track the PC's and schedule the instructions of the program code to minimize initialization code and reduce the DVLIW size. In the earlier example using the control flow graph 200 and the code arrangement 500, four copies of BB 6 are used. The compiler may reduce the number of traces, and accompanying PC register IDs, by introducing gaps. The gaps may utilize nop operations.

The steps described earlier regarding code arrangement 500 may be used here. At the completion of BB 2, the DVLIW size remains 2. However, one of the two instructions within the fetched DVLIW's is a nop operation providing a gap in the arrangement 900. The PC register ID 0 corresponds to the nop operations and the PC register ID 1 corresponds to the instructions in BB 3. At the completion of BB 3, the DVLIW is reduced from 2 to 1. Now the PC register ID 0 corresponds to the instructions in BB 4 and the PC register ID 1 corresponds to the nop operations.

At the completion of BBC (0, 4), the processor while executing code 506 at the end of BB 4 in trace 0 updates the size register from 1 to 2. The executed code 506 also updates the entries in the vector register for work-items branching to BB 6 to store PC ID 1. Two instructions may be fetched from the i-cache after sending two PC register values and the stored size to the i-cache. The two fetched instructions include intermingled instructions from BB 5 and BB 6. Work-items with an associated stored PC register ID of 0 in the vector register obtain fetched instructions from BB (0, 5). Work-items with an associated stored PC register ID of 1 in the vector register obtain fetched instructions from BB (1, 6).

At the completion of BB (1, 6), the code 506 updates the DVLIW size from 2 to 1. The work-items corresponding to BB (1, 6) halt execution, store state information, and wait until restarting execution at a next PC. The next PC may point to BB 1 or BB 7. Other steps may be performed as described earlier. The code arrangement 900 illustrates in response to determining a first trace path between the detected given divergent point and the corresponding convergent point is smaller than a second trace path between the given divergent point and the corresponding convergent point, the compiler may group nops with instructions corresponding to the second trace path in VLIW's created between the completion of the first trace path and the corresponding convergent point.

For each of the embodiments described earlier, further parallelization may occur with code being parallelized outside the loop with the code inside the loop. For example, the program code for BB 7 may be parallelized with BB 1 to terminate the program for work-items that complete the loop. Additionally, in response to detecting a PC register ID corresponds to multiple resource-independent instructions within the VLIW, rather than a single instruction, an associated work-item and execution lane may simultaneously execute the multiple resource-independent instructions within the execution lane.

Further, the compiler may decrease the DVLIW size using register allocation. Program code may include the following statement: X=(A+B)+(B+M). Here, two operations use the same opcode. A first trace includes an ADD operation such as T1=A+B. A second trace includes an ADD operation such as T2=C+D. There are work-items that use T1 from a basic block X (BB X) with a PC register ID such as 0. There are other work-items that use T2 from BB Y with a PC register ID such as 1. If a first operands pair "C" and "A", a second operands pair "B" and "D", and a results pair "T1" and "T2" are assigned to the same registers in BB X and BB Y, respectively, then the expression r3=r1+r2 may be used as a DVLIW with a size of 1. The corresponding PC register ID may be set to 0 to save on decoding time or free a slot.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Additionally, program instructions may comprise behavioral-level description or register-transfer level (RTL) descriptions of the hardware functionality in a high level programming language such as C, or a design language (HDL) such as Verilog, VHDL, or database format such as GDS II stream format (GDSII). In some cases the description may be read by a synthesis tool, which may synthesize the description to produce a netlist comprising a list of gates from a synthesis library. The netlist comprises a set of gates, which also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. Alternatively, the instructions on the computer accessible storage medium may be the netlist (with or without the synthesis library) or the data set, as desired. Additionally, the instructions may be utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
   a plurality of parallel execution lanes within a single instruction multiple data (SIMD) micro-architecture;
   a plurality of program counter (PC) registers, wherein each PC register is configured to store a PC of an instruction;
   a size register configured to store a number of instructions in a variable length instruction word (VLIW);
   a plurality of storage locations, wherein each storage location of the plurality of storage locations is associated with a different lane of the plurality of execution lanes and is programmable to store an identifier corresponding to one of the plurality of PC registers; and
   control logic configured to:
   update the size register to indicate N instructions are included in a next VLIW, wherein N is an integer greater than one when a transition from a first instruction to a second instruction represents a divergence point;
   update N of the PC registers, each of the updated PC registers identifying a different instruction of the next VLIW;
   fetch a number of instructions indicated by the size register, wherein a separate PC register of the plurality of PC registers is used to identify which instructions are fetched;
   execute the number of instructions in the plurality of execution lanes simultaneously.

2. The processor as recited in claim 1, wherein the size register is configured to store an integer value.

3. The processor as recited in claim 1, wherein a number of valid identifiers stored in the plurality of storage locations is equal to the number of instructions indicated by the size register.

4. The processor as recited in claim 1, wherein the control logic is further configured to:
   decode a number of fetched instructions equal to the number of instructions indicated by the size register; and
   assign a given one of the decoded instructions to a given lane of the plurality of execution lanes based at least in part on an identifier stored in one of the plurality of storage locations associated with the given lane and a PC value stored in a register of the plurality of PC registers.

5. The processor as recited in claim 4, wherein in response to a given one of the plurality of PC registers pointing to a plurality of resource-independent instructions, an associated one of the plurality of execution lanes is further configured to simultaneously execute the plurality of resource-independent instructions.

6. The processor as recited in claim 4, wherein in response to a given lane of the plurality of execution lanes having reached the end of a loop of instructions, the control logic is further configured to:
write a sleep state in a corresponding one of the plurality of storage locations responsive to determining at runtime the given lane is scheduled to branch back to the beginning of the loop; and
write an exit state in the corresponding one of the plurality of storage locations responsive to determining at runtime the given lane is scheduled to branch out of the loop.

7. The processor as recited in claim 6, wherein in response to the given lane being in the sleep state or the exit state, the control logic is further configured to:
halt execution within the given lane; and
store at least a next program counter (PC) and a work-item identifier (ID) for a corresponding trace.

8. The processor as recited in claim 7, wherein in response to determining each lane of the plurality of execution lanes is in the sleep state or is in the exit state, the control logic is further configured to restart execution for each lane by branching to a respective stored next PC.

9. The processor as recited in claim 8, wherein in response to each lane of the plurality of execution lanes being halted and at least one lane being in a different state than another lane, the control logic is further configured to restart execution for only lanes in a sleep state by branching to a respective stored next PC.

10. A non-transitory computer readable storage medium storing at least one program configured for execution by at least one processor of a computer system, wherein the at least one program comprising instructions executable to:
assign program instructions for execution on a plurality of parallel execution lanes within a single instruction multiple data (SIMD) micro-architecture;
maintain a plurality of program counter (PC) registers, wherein each PC register is configured to store a PC of an instruction;
maintain a size register configured to store a size of a number of instructions in a variable length instruction word (VLIW);
maintain a plurality of storage locations, wherein each storage location of the plurality of storage locations is associated with a different lane of the plurality of execution lanes and is programmable to store an identifier corresponding to one of the plurality of PC registers;
update the size register to indicate N instructions are included in a next VLIW, wherein N is an integer greater than one when a transition from a first instruction to a second instruction represents a divergence point;
update N of the PC registers, each of the updated PC registers identifying a different instruction of the next VLIW;
fetch a number of instructions indicated by the size register, wherein a separate PC register of the plurality of PC registers is used to identify which instructions are fetched; and
execute the number of instructions in the plurality of execution lanes simultaneously.

11. The non-transitory computer readable storage medium as recited in claim 10, wherein assigning a program instruction to a given lane of the plurality of parallel execution lanes is based at least in part on a branch direction found at runtime for the given lane at a given divergent point.

12. The non-transitory computer readable storage medium as recited in claim 11, further comprising instructions executable to update the size register to indicate M instructions are in a next VLIW to be fetched.

13. The non-transitory computer readable storage medium as recited in claim 12, further comprising instructions executable to:
update each of M PC registers with a corresponding PC that corresponds to a unique one of the M instructions in the next VLIW; and
update a plurality of identifiers in the plurality of storage locations mapping each one of the plurality of execution lanes to a given one of the updated PC registers.

14. A method comprising:
assigning program instructions for execution on a plurality of parallel execution lanes within a single instruction multiple data (SIMD) micro-architecture;
maintaining a plurality of program counter (PC) registers, wherein each PC register is configured to store a PC of an instruction;
maintaining a size register configured to store a number of instructions in a variable length instruction word (VLIW);
maintaining a plurality of storage locations, wherein each storage location of the plurality of storage locations is associated with a different lane of the plurality of execution lanes and is programmable to store an identifier corresponding to one of the plurality of PC registers;
updating the size register to indicate N instructions are included in a next VLIW, wherein N is an integer greater than one when a transition from a first instruction to a second instruction represents a divergence point;
updating N of the PC registers, each of the updated PC registers identifying a different instruction of the next VLIW;
fetching a number of instructions indicated by the size register, wherein a separate PC register of the plurality of PC registers is used to identify which instructions are fetched; and
executing the number of instructions in the plurality of execution lanes simultaneously.

15. The method as recited in claim 14, wherein a number of valid identifiers stored in the plurality of storage locations is equal to the number of instructions indicated by the size register.

16. The method as recited in claim 15, further comprising:
decoding a number of fetched instructions equal to the number of instructions indicated by the size register; and
assigning a given one of the decoded instructions to a given lane of the plurality of execution lanes based at least in part on an identifier stored in one of the plurality of lane registers associated with the given lane and a PC value stored in a register of the plurality of PC registers.

17. The method as recited in claim 16, wherein in response to detecting a given one of the plurality of PC registers points to a plurality of resource-independent instructions, the method further comprises simultaneously executing the plurality of resource-independent instructions in an associated one of the plurality of execution lanes.

\* \* \* \* \*

UNITED STATES PATENT AND TRADEMARK OFFICE
CERTIFICATE OF CORRECTION

PATENT NO. : 9,639,371 B2
APPLICATION NO. : 13/753113
DATED : May 2, 2017
INVENTOR(S) : Reza Yazdani It is certified that error appears in the above-identified patent and that said Letters Patent is hereby corrected as shown below:

In the Claims

Column 14, Claim 1, Line 45, please delete "fetched;" and substitute -- fetched; and --.

Signed and Sealed this
Fourth Day of July, 2017

Joseph Matal
*Performing the Functions and Duties of the
Under Secretary of Commerce for Intellectual Property and
Director of the United States Patent and Trademark Office*